US006817495B1

(12) United States Patent
Luck

(10) Patent No.: US 6,817,495 B1
(45) Date of Patent: Nov. 16, 2004

(54) PORTABLE TOOL BOX

(75) Inventor: Robin William Luck, St. Ives (AU)

(73) Assignee: Mi-Ok Pty Ltd., Brookvale (AU)

( * ) Notice: Subject to any disclaimer, the term of this patent is extended or adjusted under 35 U.S.C. 154(b) by 129 days.

(21) Appl. No.: 10/089,909

(22) PCT Filed: Oct. 5, 2000

(86) PCT No.: PCT/AU00/01219

§ 371 (c)(1),
(2), (4) Date: Aug. 5, 2002

(87) PCT Pub. No.: WO01/24941

PCT Pub. Date: Apr. 12, 2001

(30) Foreign Application Priority Data

Oct. 5, 1999 (AU) .............................................. PQ3248

(51) Int. Cl.[7] ........................... A01C 5/00; A01G 25/09

(52) U.S. Cl. ........................ 222/626; 222/608; 222/609; 239/172

(58) Field of Search ................................ 222/608, 609, 222/626; 239/146, 172, 176, 302, 308; 144/285; 312/249.1, 249.8

(56) References Cited

U.S. PATENT DOCUMENTS 4,338,987 A * 7/1982 Miles ......................... 144/285
4,375,162 A * 3/1983 Eppley .......................... 73/37
4,688,308 A * 8/1987 Alvarez ...................... 29/33 R

FOREIGN PATENT DOCUMENTS

| | | |
|---|---|---|
| GB | 339893 | 4/1952 |
| GB | 2 330 521 A | 4/1999 |
| JP | 10236557 | 9/1998 |
| JP | 10337680 | 12/1998 |
| WO | WO 99/01034 | 3/1999 |

* cited by examiner

*Primary Examiner*—Timothy L. Maust
(74) *Attorney, Agent, or Firm*—Pearne & Gordon LLP

(57) ABSTRACT

A portable tool box, including a container, an electrically operated air compressor, a vent for providing an ample supply of air, a pneumatic tool for dispensing dense materials, a pneumatic hose, and an electrical connection box.

12 Claims, 5 Drawing Sheets

PORTABLE TOOL BOX

TECHNICAL FIELD

This invention relates to portable tool boxes and more particularly to a portable tool box for a compressed air tool dispensing gun such as an adhesive gun, nail gun, mixer gun, sausage gun, ratio-pack gun and the like.

For the sake of convenience, the invention will be described in relation to a portable air-powered adhesive gun but it is to be understood that the invention extends to both other forms of dispensing gun as well as other air powered tools.

BACKGROUND ART

Adhesive guns may be either air-powered or manually actuated. Air-powered adhesive guns generally require an air compressor and an air reservoir for operation and hitherto those compressors have been very heavy, very bulky and generally difficult to move about a work site. It is these disadvantages of air-powered adhesive guns that leads to the use of manually actuated adhesive dispensing guns on building sites in circumstances where an air-powered adhesive gun would lead to greater productivity and less worker fatigue and worker injuries.

It is, therefore, an object of this invention to provide a portable air-powered tool which overcomes some, if not all, of the disadvantages associated with currently available air compressor arrangements.

SUMMARY DISCLOSURE OF INVENTION

According to one aspect of the invention there is provided a portable tool box comprising a container having a lid, within which container is mounted an electrically operated air compressor. The container has walls, and a vent mounted in one of the walls.

In one preferred embodiment of the invention, the compressor is electrically connected to a connection box which is electrically accessible from an exterior of the container.

In further embodiments of the invention, the container further comprises one or more general purpose electrical outlets which are electrically connected to the connection box.

In preferred embodiments, the tool box further contains a pneumatic hose and a tool which connects to the compressor with the hose.

In some embodiments, the container has formed therein an opening through which a hose may pass while the hose is connected to the compressor.

In particularly preferred embodiments, the compressor is adapted to operate a dispensing gun without the need for an air reservoir or accumulator.

In some embodiments, the compressor is a medical grade-free compressor.

The invention also provides a method of dispensing comprising the steps of:

(i) operating a continuously operating air compressor within a portable tool box, and (ii) dispensing a substance from a gun, the gun powered by air delivered by the compressor through a hose which extends between the compressor and the gun when the portable tool box is closed.

In preferred methods of the invention, the continuously operating air compressor does not require an air reservoir or accumulator.

According to other aspects of the invention there is provided a portable air-powered tool comprising a container having an opening and closed by a lid, an electrically driven air compressor mounted within the container, at least one air vent in the walls of the container to permit air flow from the exterior to the interior of the container, electrical circuitry means within the container electrically connected to the air compressor and adapted to be connected to a power supply, said container being adapted to house an air-powered gun and an air line for connecting the gun to the air compressor.

In one form of the invention, the electrical circuitry is connected to a general purpose power outlet adapted to receive an electrical lead for electrical devices such as lights, vacuum cleaners and power tools. The electrical circuitry may include a switch which enables the compressor to be switched off with the other device remaining on.

The electrical circuitry may be connected to a battery pack within or external of the container or may be adapted for connection to a main supply.

In a preferred form of the invention there is provided locking means for locking the lid to the container. The container may be provided with wheels, multiple handles and/or a pull-out handle.

BRIEF DESCRIPTION OF THE DRAWINGS

In order that the invention may be more readily understood and put into practical effect, reference will now be made to the accompanying drawings in which.

BEST MODE FOR CARRYING OUT THE INVENTION

Figure 1:
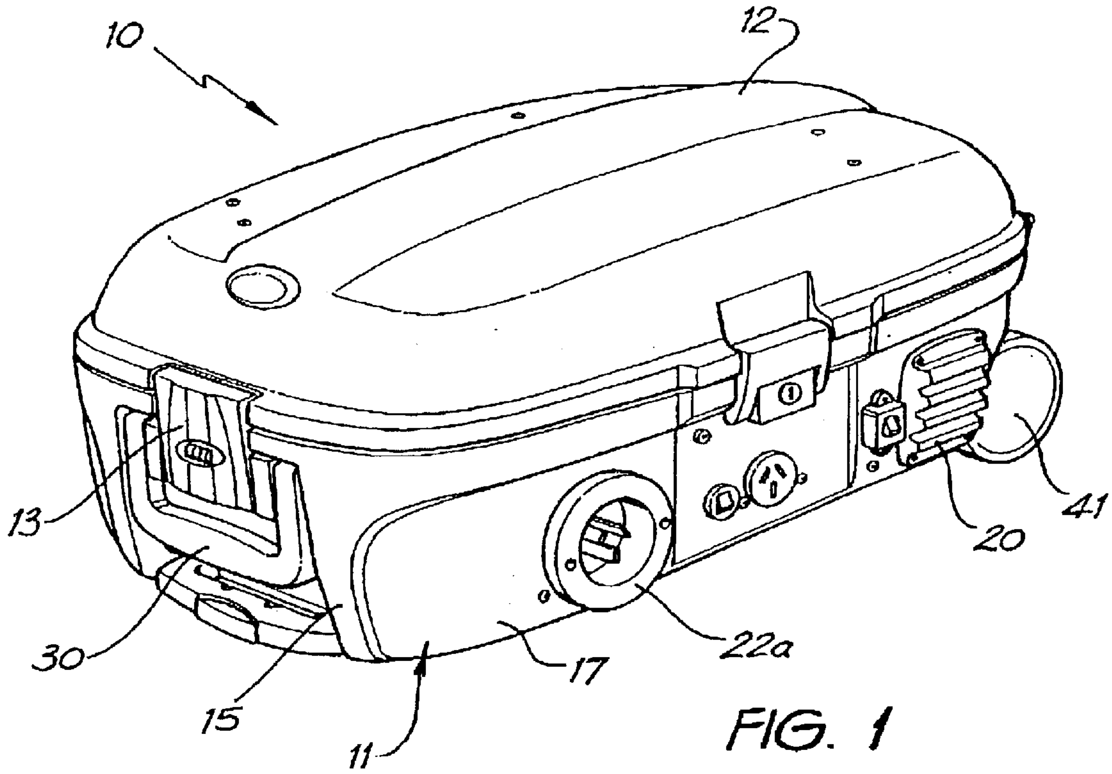
FIG. 1 is a perspective view of a potable tool box according to the teachings of the present invention.
Figure 2:
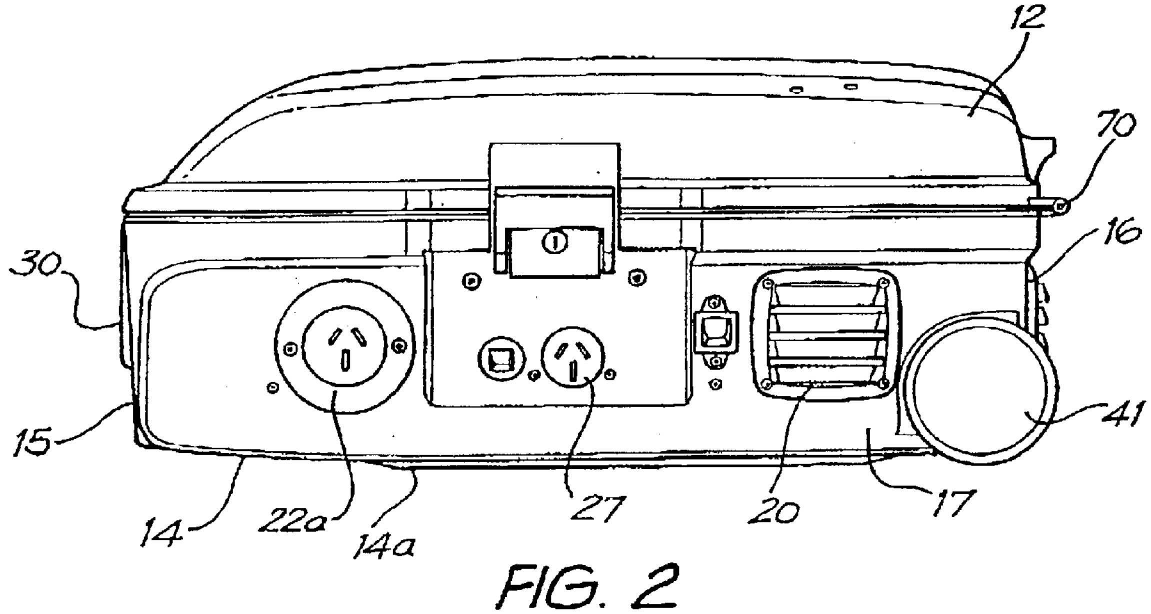
FIG. 2 is a side elevation of the device depicted in FIG. 1.
Figure 3:
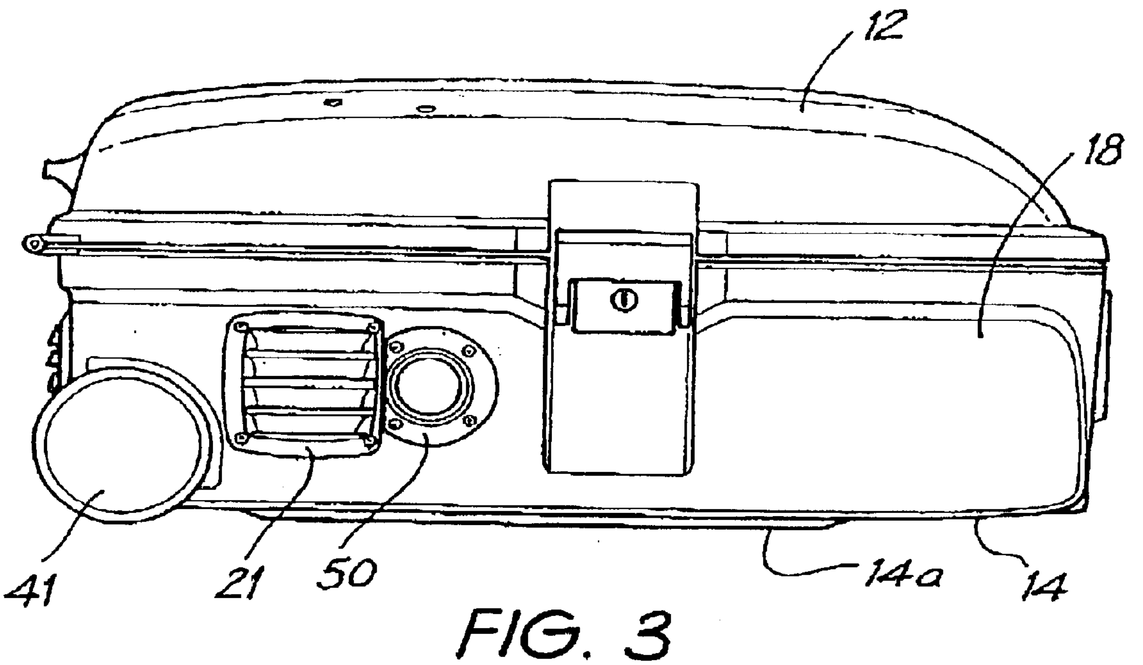
FIG. 3 is another side elevation of the device depicted in FIG. 1.
Figure 4:
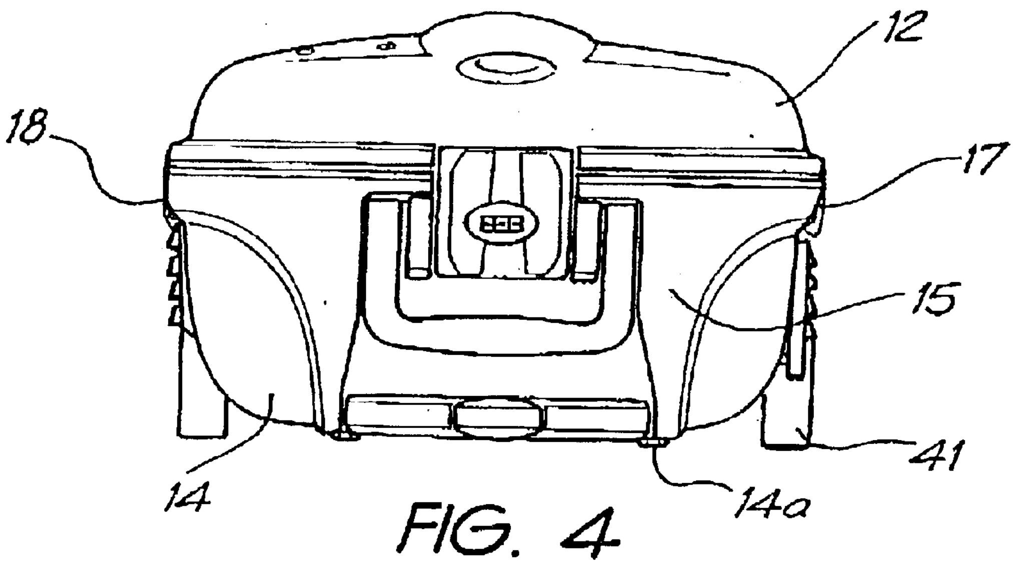
FIG. 4 is an end elevation of the device depicted in FIGS. 1 to 3.
Figure 5:
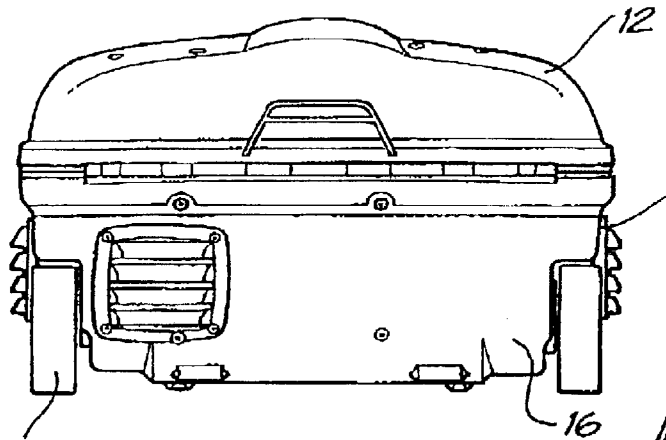
FIG. 5 is another end view of the device depicted in FIGS. 1 to 4.
Figure 6:
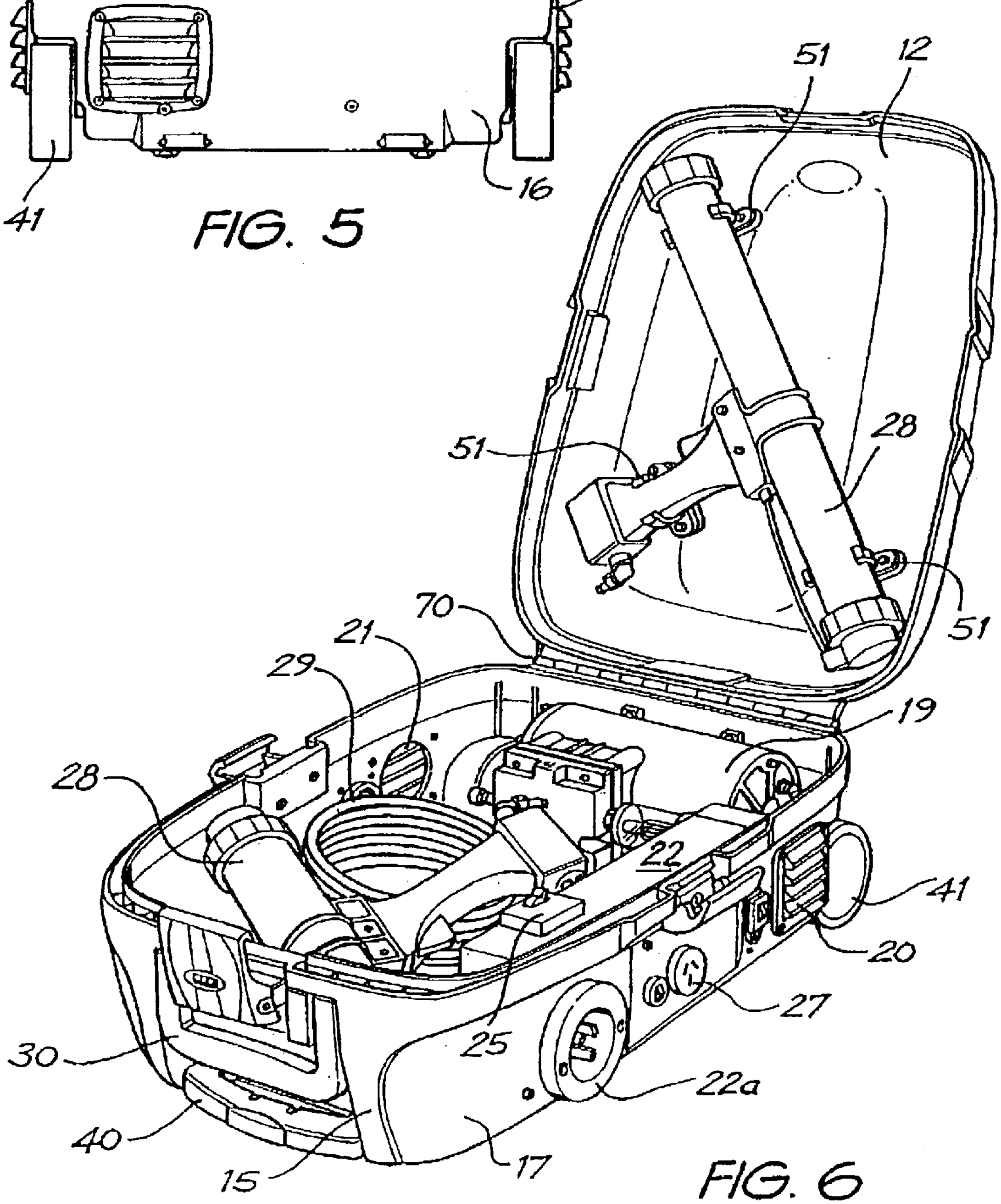
FIG. 6 is an isometric perspective of the device of the present invention with the lid open.
Figure 7:
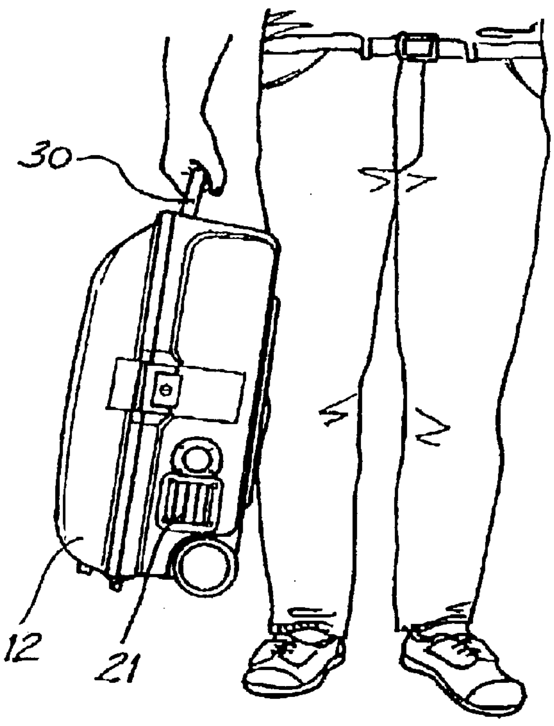
FIG. 7 is a front view of the device being carried.

The tool box 10 shown in the drawings includes a container 11 having a lid 12 and locking means 13. The container 11 has a base 14 with optional skids 14*a*, end walls 15 and 16 and side wall 17 and 18. An electrically operated air compressor 19 is mounted within the container 11 on or near the base 14. Air vents 20 and 21 are provided in the end walls 15 and 16. The container is preferably formed from high impact polymer in a clamshell design with a hinge 70 along a bottom edge.

An electrical circuit within the container 11 includes a connection box 22 adapted to be connected from a fixture 22*a* to a main supply by an extension lead. A line leads from the box 22 to the electrical terminals of the compressor 19 through an on/off switch 25. Line 26 connects one or more general purpose outlets 27 to the connection box 22. The purpose of the switch 25 is to enable power to be supplied to the general purpose outlets 27 when the compressor 19 is turned off. For example, a light could be connected to one of the general purpose outlets 27 and it can be therefore used without having to run the compressor at the same time. The circuitry may also incorporate a miniature circuit breaker and a residual current device.

An adhesive gun 28 is positioned within the container 11 for example with clips 51 along with an air hose line 29 which is used to couple the gun 28 to the compressor 19.

Preferably, the compressor 19 is a light weight compressor having a long term continuous operating capacity which enables the use of a much smaller and lighter compressor than currently used compressors which may have a substantial accumulator vessel that is charged by the intermittent running of the compressor. Preferably, the compressor is a medical grade oil-free compressor. The compressor may be moderated by a blow-off valve with silencer which maintains an optimum pressure level and prevents pressure back-up during re-starts and motor overload. It is anticipated that the complete portable operated tool of the invention would weigh in the vicinity of 5 kg as opposed to 25 to 30 kg or much more for current equipment.

In this instance, the container 11 has a handle 30 but various combination of handles could be provided on the lid 12, the side walls and the end walls 15 and 16 of the container 11. A pull-out handle 40 could also be used in which case the container 11 would be fitted with wheels 41 as shown in FIG. 8.

Figure 8:
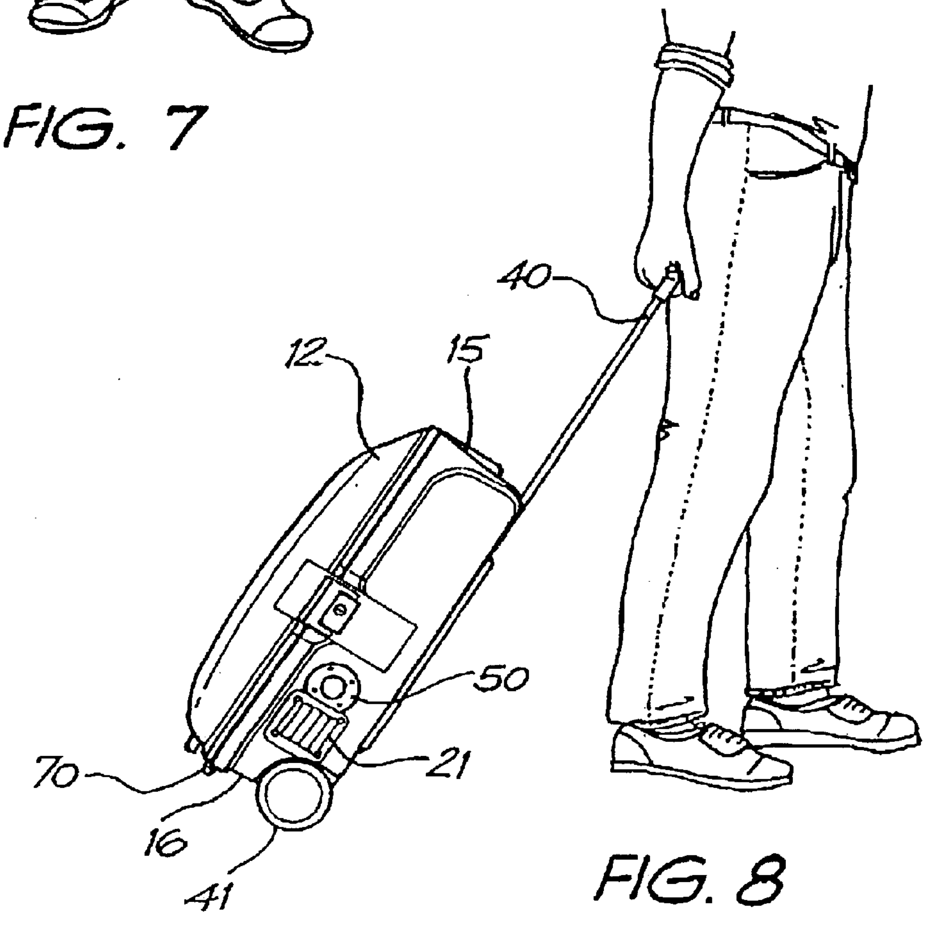
FIG. 8 is a side view of the device being pulled on its wheels.
Figure 9:
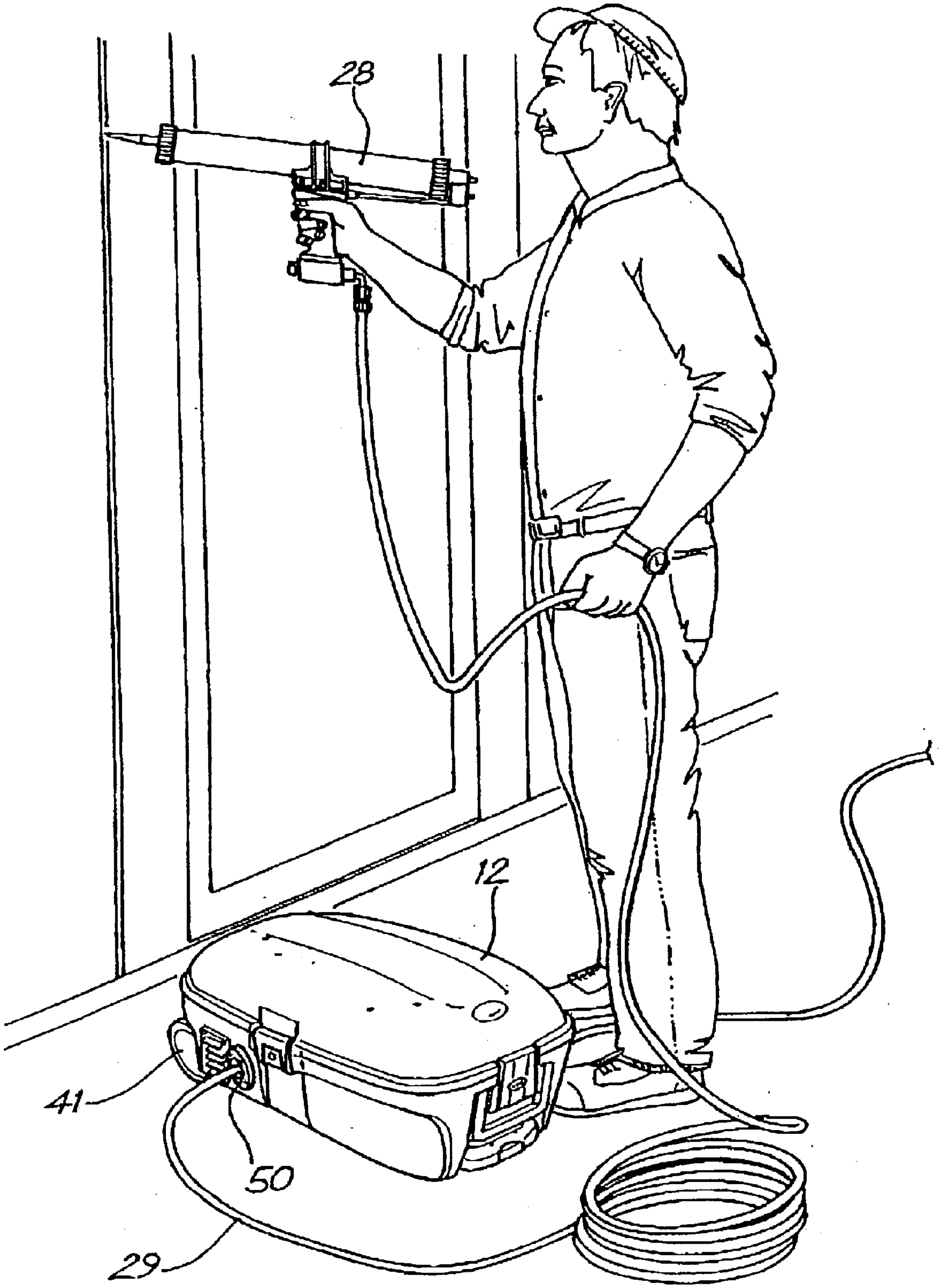
FIG. 9 depicts in perspective view a person utilising the device of the present invention with the case closed.

As shown in FIGS. 8 and 9 an opening 50 is provided in a wall to allow the hose 19 to exit the container when the hose is connected to the compressor 19.

Various other modifications may be made in details of design and construction without departing from the scope and ambit of the invention. For example, the compressor 19 could be coupled to one or more air vents by a housing to ensure that items placed in the container 11 do not block the flow of air to the compressor 19. Releasable fastener means may be provided to secure the adhesive gun 28 and the hose line 29.

What is claimed is:

1. A portable tool box, comprising:

a container having a lid, walls, an extensible handle, wheels, and an opening formed therein through which a pneumatic hose may pass;

an electrically operated air compressor disposed within the container, wherein the air compressor is of a continuous pressure type operable without an air reservoir or accumulator;

vent means for providing an ample supply of air to the air compressor when the lid of the container is closed;

a pneumatic tool for dispensing dense materials, wherein the tool is connected to the air compressor by the pneumatic hose and operable when the lid of the container is closed; and an electrical connection box electrically accessible from an exterior of the container and having at least one independently operable general purpose electrical outlet connected thereto.

2. The tool box of claim 1 wherein:

the container further comprises one or more internally mounted clips for retaining tools which may be provided by the compressor.

3. The portable tool box of claim 1 wherein:

the container further comprises one or more skids mounted on an exterior of a wall.

4. The tool box of claim 1 wherein:

the compressor is a medical grade oil-free compressor.

5. The tool box of claim 1 wherein:

the container is molded from a high impact polymer in a clamshell design.

6. The tool box of claim 1 wherein:

the compressor further comprises a pressure relief valve.

7. The tool box of claim 1 wherein:

an electrical circuit to which the connection box is electrically connected further comprises a residual current device.

8. The tool box of claim 1 wherein:

an electrical circuit to which the connection box is electrically connected further comprises a miniature circuit breaker.

9. The portable tool box of claim 1 wherein:

the container further comprises a lock for the lid.

10. A method of dispensing a dense material from a tool, comprising the steps of:

providing a container having a lid, walls, an extensible handle, wheels, and an opening formed therein through which a pneumatic hose may pass;

providing electricity to an electrical connection box from an external source;

providing electricity from the electrical connection box to an electrically operated air compressor disposed within the container, wherein the air compressor is of a continuous pressure type operable without an air reservoir or accumulator;

providing vent means for providing an ample supply of air to the air compressor when the lid of the container is closed;

providing a pneumatic tool for dispensing dense materials, wherein the tool is connected to the air compressor by the pneumatic hose and operable when the lid of the container is closed;

operating the air compressor within the container while the lid of the container is closed; and dispensing the dense material from the pneumatic tool, wherein the tool is powered by air delivered by the compressor through the hose.

11. The method of claim 10 wherein:

the compressor is a medical grade oil-free compressor.

12. The method of claim 10 wherein:

the operation of the air compressor is moderated by a blow-off valve and silencer which maintain the compressor at an optimum pressure level and, during re-starts prevent pressure back-up and motor overload.

* * * * *